(12) United States Patent
Zhang et al.

(10) Patent No.: US 9,906,584 B2
(45) Date of Patent: Feb. 27, 2018

(54) TERMINAL DEVICE, SYSTEM, AND METHOD FOR ACCESSING VIRTUAL DESKTOP

(71) Applicant: ZTE CORPORATION, Shenzhen, Guangdong Province (CN)

(72) Inventors: Hengsheng Zhang, Shenzhen (CN); Pei Zhao, Shenzhen (CN); Zhiping Wang, Shenzhen (CN); Mingdong Li, Shenzhen (CN); Xiaohua Chen, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 291 days.

(21) Appl. No.: 14/439,395

(22) PCT Filed: Aug. 23, 2013

(86) PCT No.: PCT/CN2013/082164
§ 371 (c)(1),
(2) Date: Apr. 29, 2015

(87) PCT Pub. No.: WO2014/067325
PCT Pub. Date: May 8, 2014

(65) Prior Publication Data
US 2015/0281327 A1     Oct. 1, 2015

(30) Foreign Application Priority Data

Oct. 30, 2012   (CN) .......................... 2012 1 0424059

(51) Int. Cl.
*G06F 15/16*     (2006.01)
*H04L 29/08*     (2006.01)
(Continued)

(52) U.S. Cl.
CPC .............. *H04L 67/08* (2013.01); *G06F 3/01* (2013.01); *G06F 3/04842* (2013.01);
(Continued)

(58) Field of Classification Search
CPC ......... H04L 67/04; H04L 67/08; H04L 67/38; H04L 29/06034; H04L 29/06306;
(Continued)

(56) References Cited

U.S. PATENT DOCUMENTS

| | | | |
|---|---|---|---|
| 6,463,459 B1 * | 10/2002 | Orr ....................... | G06F 9/4445 709/202 |
| 2006/0282253 A1 * | 12/2006 | Buswell ................ | G06F 3/1454 703/22 |

(Continued)

FOREIGN PATENT DOCUMENTS

| | | |
|---|---|---|
| CN | 101616043 A | 12/2009 |
| CN | 102307153 A | 1/2012 |
| CN | 102411688 A | 4/2012 |
| CN | 102724213 A | 10/2012 |

*Primary Examiner* — Brendan Higa
(74) *Attorney, Agent, or Firm* — Ling Wu; Stephen Yang; Ling and Yang Intellectual Property (57) ABSTRACT

A terminal device, system and method for accessing a virtual desktop, the terminal device includes: a plurality of peripheral interface groups, configured to connect with a plurality of peripheral groups, wherein each of the peripheral groups comprises one or more input apparatus; a plurality of virtual machines, configured to control corresponding desktops supplied by a virtual desktop server system according to operating data input by the peripheral groups; and a network interface, configured to connect with the virtual desktop server system. With the above terminal device, system and method, the cost of the current virtual desktop system can be reduced effectively.

11 Claims, 4 Drawing Sheets

(51) Int. Cl.
*G06F 9/50* (2006.01)
*G06F 3/01* (2006.01)
*G06F 9/44* (2018.01)
*G06F 3/0484* (2013.01)

(52) U.S. Cl.
CPC ........ *G06F 3/04847* (2013.01); *G06F 9/4445* (2013.01); *G06F 9/5077* (2013.01); *H04L 67/04* (2013.01)

(58) Field of Classification Search
CPC ........... H04L 29/08108; H04L 65/1059; G06F 9/4445; G06F 9/455–9/45554; G06F 9/5077
See application file for complete search history.

(56) References Cited

U.S. PATENT DOCUMENTS

| | | | |
|---|---|---|---|
| 2008/0201414 A1* | 8/2008 | Amir Husain | G06F 9/445 709/203 |
| 2009/0006537 A1* | 1/2009 | Palekar | G06F 9/5027 709/203 |
| 2010/0058341 A1 | 3/2010 | Jung et al. | |
| 2010/0289744 A1* | 11/2010 | Cohen | H04L 49/153 345/163 |
| 2012/0311564 A1* | 12/2012 | Khalid | G06F 8/61 718/1 |
| 2016/0011896 A1* | 1/2016 | Khalid | G06F 9/45558 718/1 |
| 2016/0117268 A1* | 4/2016 | Griffin | G06F 13/4282 710/10 |

\* cited by examiner

TERMINAL DEVICE, SYSTEM, AND METHOD FOR ACCESSING VIRTUAL DESKTOP

TECHNICAL FIELD

The present document relates to communication and information field, and particularly, to a terminal device, a system and a method for accessing a virtual desktop.

BACKGROUND OF THE RELATED ART

In the conventional industry IT environment, an industry is required to provide each staff with a separate PC to support the staff in his/her normal work. This way has the following disadvantages: firstly, there is a problem of cost as the separate PC is not cheap, and the separate PC brings large power consumption and a rather high expenditure of electric charge cost; secondly, it is difficult to manage the separate PC and the information property of the industry can be stolen easily, resulting in a serious information safety problem.

With the development of the technical of cloud computing, the virtual desktop is introduced to the industry office environment. With the virtual desktop, the desktops are in centralized management in the server side, and it can merely display the desktop in the client side, therefore the problem which the current industry IT environment faces is solved. The advantages of this kind of frame of the virtual desktop system are: firstly, the user desktops are uniformly hosted in the server side, and the users cannot access the electronic files directly for users, which ensures the safety of the information property of the industry; secondly, in the client side, it merely displays the desktops and maintains the users' IOs without participating in calculations, lowing the requirement for the performance of the client sides. Therefore, in the current virtual desktop structure, the client side usually adopts a thin terminal to further reduce the cost.

Figure 1:
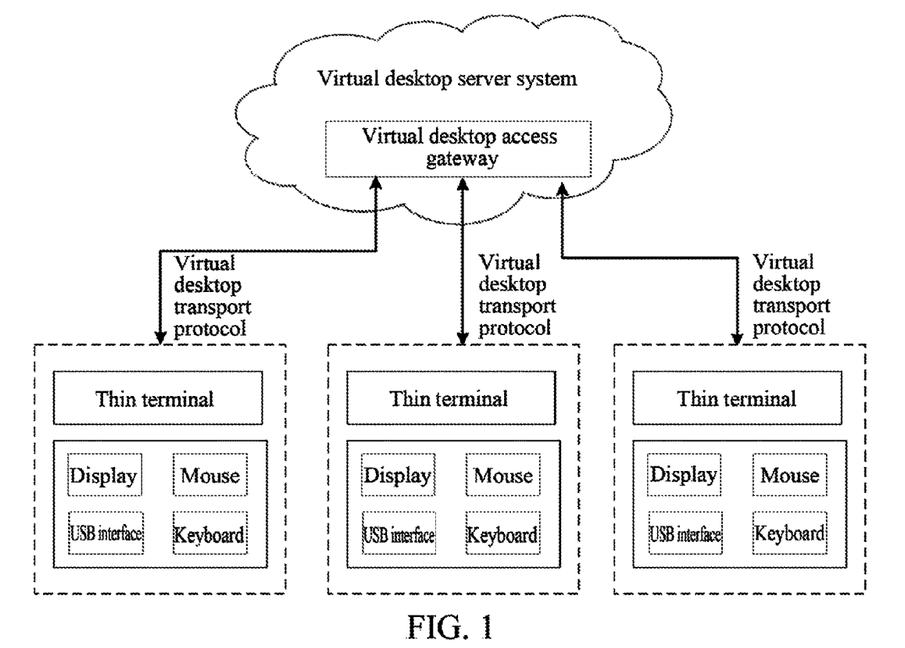
FIG. 1 is the schematic diagram for a conventional terminal device accessing a virtual desktop.

First of all, an access solution adopted for accessing the virtual desktop in the current field is introduced, as shown in FIG. 1:

When the user uses the virtual desktop system, the user needs to have a thin terminal, which is equivalent to a slimmed PC, connected with human-computer interaction peripherals such as a display, a keyboard, a mouse and so on. The user accesses the internet with the thin terminal and connects to a virtual desktop access gateway, through which the user accesses a specific virtual desktop. The virtual desktop protocols (such as ICA, PCoIP, SPICE etc.) are adopted to transmit data between the thin terminal and the virtual desktop system.

In the current virtual desktop usage program, as each user needs a thin terminal, the cost of hardware is still very high.

SUMMARY

The technical problem to be solved by the present document is to provide a terminal device, a system and a method for accessing a virtual desktop, in order to solve the problem of high cost of the current virtual desktop system.

To solve the above technical problem, the present document provides a terminal device, and the terminal device comprises:

a plurality of peripheral interface groups, configured to: connect with a plurality of peripheral groups respectively, wherein each of the peripheral groups comprises one or more input apparatus;

a plurality of virtual machines, configured to: control corresponding virtue desktops supplied by a virtual desktop server system according to operating data input by the peripheral groups; and a network interface, configured to: connect with the virtual desktop server system.

To solve the above technical problem, the present document further provides a system for accessing a virtual desktop, and the system comprises a plurality of peripheral groups used for human-computer interaction and the terminal device as described above.

To solve the above technical problem, the present document further provides a method for accessing a virtual desktop, and the method is realized based on a terminal device, wherein, the terminal device supports a plurality of peripheral groups used for human-computer interaction, and the terminal device comprises a plurality of peripheral interface groups, a plurality of virtual machines, and a network interface, the method comprises:

the peripheral groups establishing connections with corresponding peripheral interface groups, wherein each of the peripheral groups comprises one or more input apparatus;

operating data input by the peripheral groups being transmitted to corresponding virtual machines through corresponding peripheral interface groups;

the virtual machines controlling corresponding virtual desktops supplied by the virtual desktop server system through the network interface according to the operating data.

The embodiments of the terminal device, system and method according to the present document support connections with a plurality of peripheral groups, so that a plurality of users can access in a uniform and centralized way, providing a new application mode for the virtual desktop system, reducing the cost of the virtual desktop system, and improving the performance of the virtual desktop.

PREFERRED EMBODIMENTS OF THE INVENTION

Figure 2:
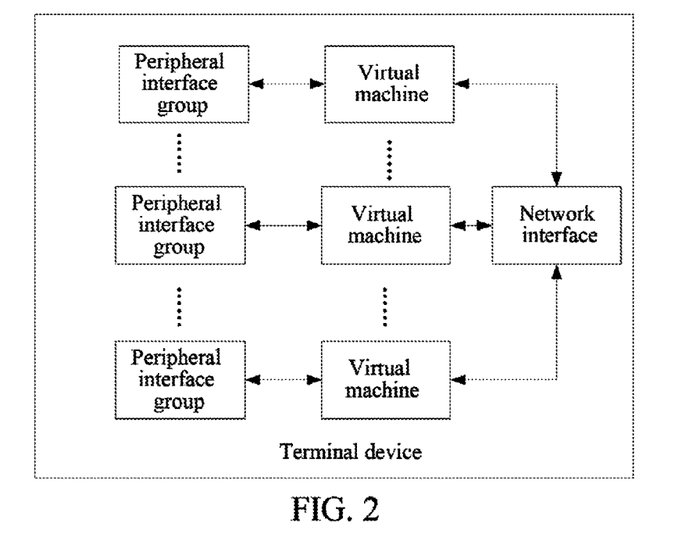
FIG. 2 is the schematic diagram of the modular structure of a terminal device according to the present document.

In the embodiments of the present document, the terminal device supports connections with a plurality of peripheral groups. The plurality of peripheral groups can be connected to the terminal device with flexibility. The terminal device supports a plurality of peripheral groups in simultaneously using the terminal device to connect to the virtual desktop system and operating the virtual desktop thereof respectively. As shown in FIG. 2, the terminal device comprises:

a plurality of peripheral interface groups, used to connect with a plurality of peripheral groups respectively, wherein each of the peripheral groups comprises one or more input apparatus;

a plurality of virtual machines, used to control corresponding virtual desktops supplied by the virtual desktop server system based on operating data input by the peripheral groups; and a network interface, used to connect with the virtual desktop server system.

Comprehensibly, the user may perform the operation on the virtual desktop through the input apparatus. Preferably, the peripheral groups further comprise output apparatus, wherein the virtual machines are further used to drive and manage the output apparatus of the peripheral groups.

Generally, the input apparatus includes but is not limited to a keyboard or mouse; the output apparatus includes but is not limited to a display and/or USB interface.

Comprehensibly, the terminal device according to the present document can support a plurality of users in controlling the respective virtual desktops thereof with the respective apparatus groups thereof. Correspondingly, the peripheral groups are independent of (or isolated from) one another without interference, so do the virtual machines.

The peripheral interface groups and the peripheral groups as demonstrated in the embodiments of the present document can be classified according to the controlled virtual desktops or the users controlling the virtual desktops. In the specific applications, the peripheral interface groups, the peripheral groups, and the corresponding relationships among the peripheral groups, peripheral interface groups, and the virtual machines can be allocated dynamically, or configured statically. The present document does not make any confinement on it.

The peripheral interface groups and the corresponding peripheral groups use one or more connection techniques. The connections are wired or wireless. The peripheral groups are connected to the peripheral interface groups according to the present document via wire or wirelessly, or any combination of the both; thereby supporting a plurality of users to operate separately.

The virtual machines and the virtual desktop server system use the virtual desktop transport protocols (such as ICA, RDP, PCoIP and SPICE) for communication.

The terminal device supports isolation of the peripheral groups from one another. The virtual solution is adopted, and each of the peripheral groups is driven and managed by a separate virtual machine. The peripheral groups are isolated from one another with the strict isolation mechanism existing among the virtual machines. Alternatively, the isolation of the peripheral groups from one another is performed by deriving and managing the peripheral groups.

The apparatus can support a plurality of Virtual Desktop Infrastructure (VID) protocols in using a plurality of desktop transport protocols (such as ICA, RDP, PCoIP, SPICE) for the connection with the virtual desktop server system.

Figure 3:
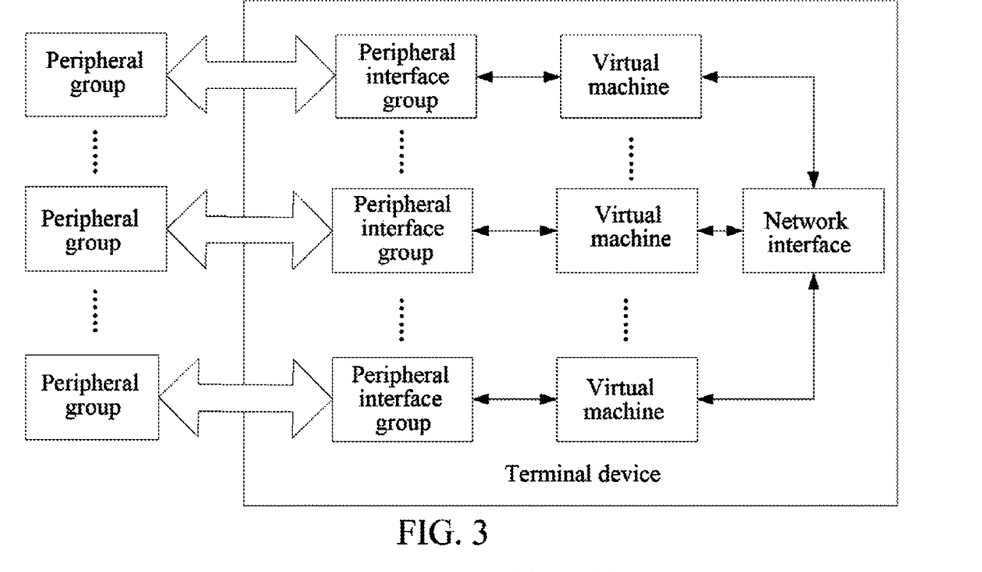
FIG. 3 is the schematic diagram of the modular structure of a virtual desktop accessing system according to the present document.

Furthermore, the present document also provides a system for accessing a virtual desktop, as shown in FIG. 3. The system comprises a plurality of peripheral groups used for human-computer interaction, and a terminal device as described above.

Specifically, the peripherals such as a display, keyboard, mouse, USB interface and so on may make up one peripheral group. One user can be supplied with one peripheral group for operation. The peripheral group is connected to the peripheral interface group of the terminal device according to the present document via wire or wirelessly. The terminal device supports connections with a plurality of peripheral groups at the same time, with the peripheral groups being isolated from one another. A plurality of the peripheral groups can be connected flexibly to the terminal device, and the terminal device supports a plurality of peripheral groups in using the terminal device simultaneously to connect to the virtual desktop system and control the respective virtual desktop thereof.

The terminal device and system according to the present document can be accessed by a plurality of users in a uniform and centralized way, which provides a new application scheme for the virtual desktop system, decreases the cost of the virtual desktop system, improves the virtual desktop performance, and decreases the hardware cost apparently especially in the industry office environment.

The present document will be described in detail in the following by combination with figures and embodiments.

It needs to note that the embodiments and the features of the embodiments in the present application can be combined with one another in the case of no confliction.

Figure 4:
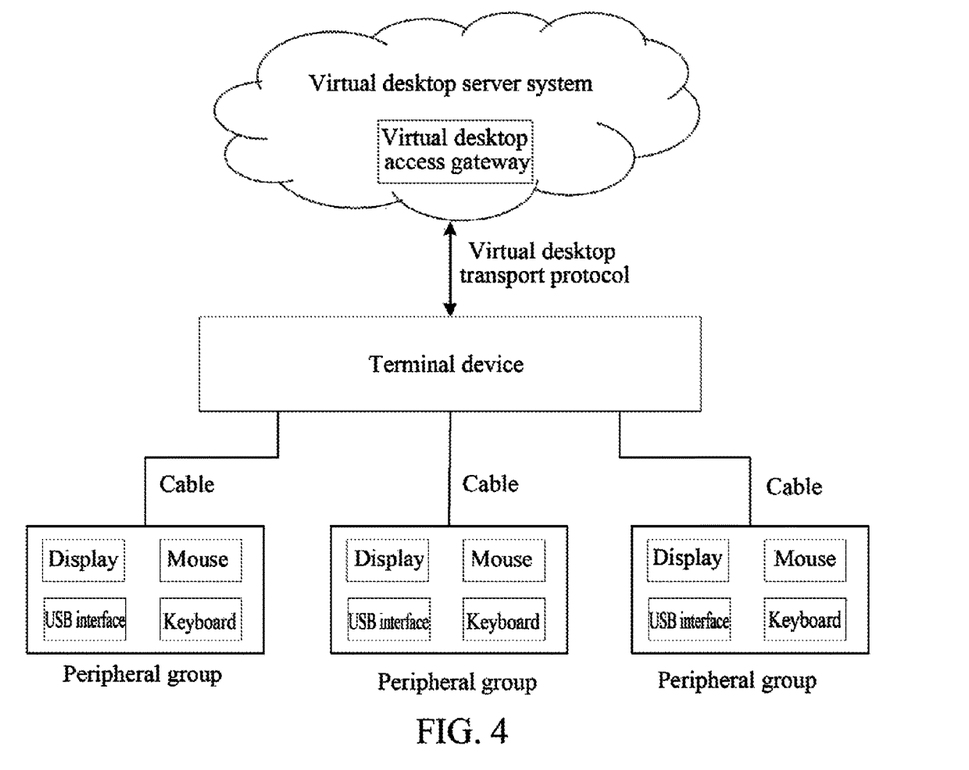
FIG. 4 and FIG. 5 are schematic diagrams of specific application examples of a system for accessing a virtual desktop according to the present document.
Figure 5:
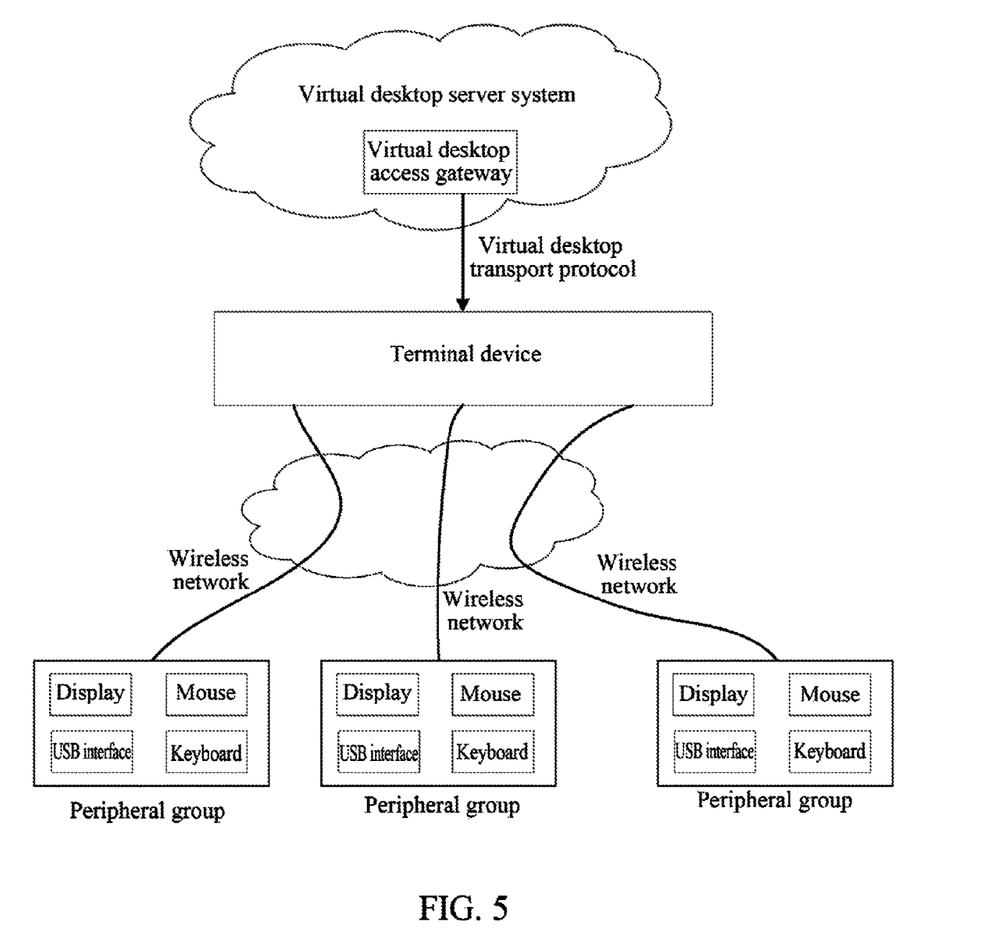

As shown in FIG. 4 and FIG. 5, the peripheral group is a group of computer peripherals, including display, mouse, keyboard, USB interface etc., wherein the display, mouse, keyboard, USB interface etc. constitute a peripheral group. Wherein, each peripheral in the peripheral group can be connected to the terminal device by various existed peripheral connection techniques such as cable, Bluetooth, or WIFI and so on.

The terminal device is a computer device configured with a plurality of peripheral interfaces. The peripheral interfaces with the type of cable, Bluetooth, or WIFI etc. can be configured as needed, wherein the terminal device classifies the peripheral interfaces, and each group of peripheral interfaces is called a peripheral interface group corresponding to a peripheral group, which is provided to the peripheral group to perform peripheral connection. The terminal device further comprises a network interface, which can be connected with the virtual desktop server system via a wired network or wireless network, for example, the terminal device has a network interface supporting IEEE 802.11 b/g/n as well as IEEE 802.3, as a result, it can be connected to the IP network.

Embodiment 1

Corresponding to the device as shown in FIG. 4, the peripheral group includes a display, mouse, and keyboard. Other peripherals are similar. The terminal device is a terminal device. In this embodiment, the peripherals in each peripheral group are connected to the terminal device via wired cables. For convenience in description, peripherals in the peripheral groups are assumed to be the display, keyboard, and mouse.

Figure 6:
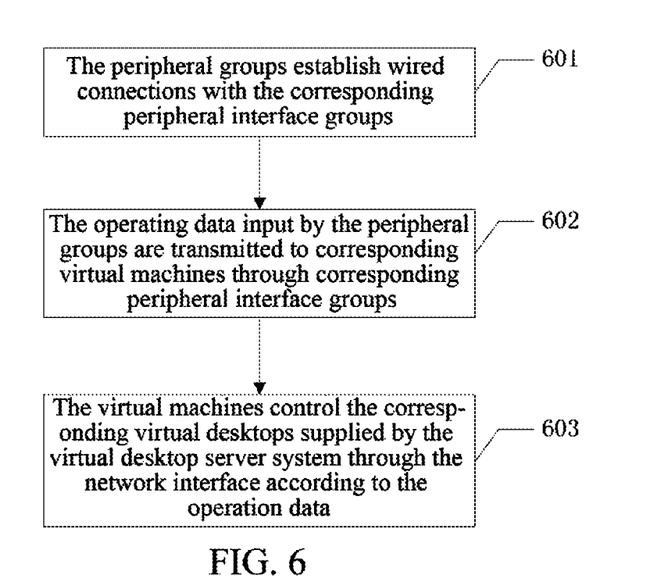
FIG. 6 and FIG. 7 are schematic diagrams of embodiments of a method for accessing a virtual desktop according to the present document.

The embodiment 1 of the method for accessing a virtual desktop according to the present document is implemented based on the above described terminal device, as shown in FIG. 6. The method comprises:

In step 601, the peripheral groups establish wired connections with the corresponding peripheral interface groups;

In step 602, the operating data input by the peripheral groups are transmitted to corresponding virtual machines through corresponding peripheral interface groups;

as described above, the peripheral groups are independent of one another, so do the virtual machines.

Before the operating data are transmitted to the corresponding virtual machines, the following operations are performed:

In step a, the terminal device is powered on;

wherein, the terminal device adopts a virtualization solution, a fixed number of virtual machines are started by default, and the number of the virtual machines correspond to the peripheral group number of the peripheral groups connected to the terminal device.

In Step b, the terminal device allocates the connected peripheral groups to the corresponding virtual machines dynamically, i.e. establishes the corresponding relationships among peripheral groups, peripheral interface groups and virtual machines dynamically. Each virtual machine corresponds to one peripheral group, and the peripherals of the peripheral group are managed by the corresponding virtual machines directly. The peripheral group comprises a display, keyboard, and mouse. The user can control and manipulate the corresponding virtual machines through the peripherals of the peripheral group directly.

In Step c, the terminal device is powered on successfully, the system is started, all of the virtual machines are all started, and the peripherals of each virtual machine are the respective peripheral group to which the virtual machine is connected.

The user transmits the operating data to the corresponding virtual machine through the corresponding peripheral interface by operating the peripheral of the peripheral group, thereby implementing the control on the corresponding virtual machines of the terminal device.

In Step 603, the virtual machines control the corresponding virtual desktops supplied by the virtual desktop server system through the network interface according to the operation data;

the terminal device can be simultaneously operated by a plurality of users with the support of the plurality of peripheral groups to use the virtual desktop system. The operation experiences of the user are similar to the operation experiences when the thin terminal is used.

Alternatively, the peripheral interface groups, the peripheral groups, and the corresponding relationships among the peripheral groups, the peripheral interface groups and the virtual machines can be configured statically.

Embodiment 2

Corresponding to the device in FIG. 5, the peripheral group includes a display, mouse, and keyboard. Other peripherals are similar. The terminal device is a terminal device. In this embodiment, the peripherals in each peripheral group are connected to the terminal device by wireless techniques. For convenience in description, peripherals in the peripheral groups are assumed to be the display, keyboard, and mouse.

Figure 7:
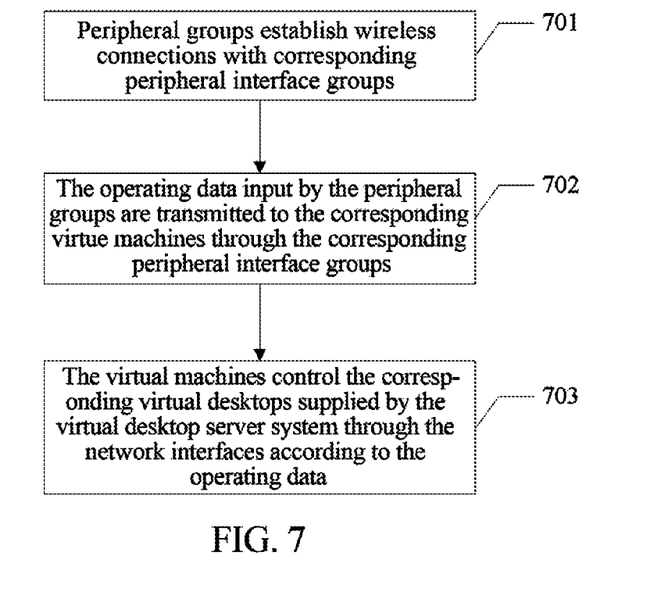

As shown in FIG. 7, embodiment 2 of the method for accessing the virtual desktop comprises:

In step 701, peripheral groups establish wireless connections with corresponding peripheral interface groups;

as the connection is a wireless connection, the terminal is required to be powered on to start, wherein, the terminal device adopts a virtualization solution, a fixed number of virtual machines are started by default, and the number of the virtual machines corresponds to the peripheral group number of the peripheral groups connected to the terminal device.

The terminal device system allocates the wireless accessing devices (such as Bluetooth modules etc.) thereof to the respective corresponding virtual machines of the wireless accessing devices themselves, i.e. establishes the corresponding relationships between the peripheral interface groups and the virtual machines dynamically. After the virtual machines of the terminal device are started, the wireless accessing devices of the virtual machines are started to wait for the connection with peripherals supporting wireless accessing techniques of the peripheral groups.

The users powers on the peripheral groups, the peripherals in the peripheral groups connect with the corresponding peripheral interfaces and virtual machines automatically according to the preset device matching information, i.e. the corresponding relationships among the peripheral groups, peripheral interface groups, and virtual machines are established dynamically. For instance, the keyboards and mouses can be connected in pair by Bluetooth technique. The displays can be connected by display techniques (WiFi Display) of WiFi alliance, Wireless Home Digital Interface (WHDI), Wireless High Definition (WiHD) and so on.

In Step 702, the operating data input by the peripheral groups are transmitted to the corresponding virtue machines through the corresponding peripheral interface groups;

the users can completely control the corresponding virtual machines on the terminal device by controlling the peripheral groups connected with the terminal device successfully among the peripheral groups, where the operating data input by the peripheral groups can be transmitted to the corresponding virtual machines through the corresponding peripheral interface groups.

In Step 703, the virtual machines control the corresponding virtual desktops supplied by the virtual desktop server system through the network interfaces according to the operating data.

The users log on the remote virtual desktop system by controlling the virtual machines on the terminal device. In another words, the terminal device can be controlled by a plurality of users simultaneously with the support of the plurality of peripheral groups to use the virtual desktop system. The operation experiences of the users are same with those when the thin terminals are used.

Comprehensibly, in both the above embodiment 1 and embodiment 2 of the method, the users performing operation on the virtual desktop through the peripheral groups is described, and correspondingly, the displays are used as output devices, the method further comprises:

the output of the virtual desktops of the virtual desktop server system is transmitted to the corresponding virtual machines through network interfaces;

the virtual machines drive and manage the output apparatus of the corresponding peripheral groups through the peripheral interface groups.

Thereby driving and managing the displays of the peripheral groups are achieved. If the peripheral groups further comprise USB interfaces, then reading and writing operation on the devices connected through the USB interfaces can be achieved.

Of course, one or more modes of connection techniques between a peripheral group and a peripheral interface group can be adopted, and both the wireless and wired connection modes can be adopted. The present document does not limit the specific connection ways and adopted connection techniques.

Of course, the present document may have other various embodiments. Those skilled in the art can make various corresponding changes and transformation according to the present document without departing from the spirit and the essence of the present document, however, all the corresponding changes and transformations shall fall within the scope protected by the claims appended to the present document.

The terminal device, system and method according to the present document support connections with a plurality of peripheral groups so that a plurality of users are supported to connect to the virtual desktop server simultaneously, i.e. it is enough for a plurality of users to have one such terminal device, and it is not necessary to provide a separate thin terminal for each user any more, which will further decrease the cost. Moreover, such a device deals with a plurality of desktop simultaneously, which can improve the efficiency of caching the desktop elements in the client side, and is beneficial for further optimizing the virtual desktop transport protocols, thereby it is beneficial for improving the virtual desktop performance. Especially for the office places in a small scale using the virtual desktops, by applying the method, terminal device, and system disclosed by the present document, it can decrease the usage cost and the cost of the operation and maintenance of the user, and improve the operation experiences of the users.

For clarity, not all of the common features of the device are shown and described here. Of course, it should be understood that during the development of any actual device, the determination on the certain implementation method must be made to achieve a certain object of the developer. For example, to meet the constraint related to applications and business, the certain objects change with different implementation methods and different developers. Moreover, it should be understood that the development work is complicated and time-consuming, however, even so, the technical work performed is regular for the ordinary persons skilled in the art under the inspiration of the content disclosed by the present document.

According to the topics described here, various types of operation systems, computer platforms, computer programs, and/or common machines can be used to fabricate, operate and/or execute various components, systems, devices, processing steps and/or data structures. Besides, it will be clear for the ordinary persons skilled in the art that devices which are not common can also be used without departing from the scope and spirit essence of the ideas of the invention disclosed here. Wherein, the contained methods are executed by computers, devices or machines, and these methods can be stored as machine-readable instructions, which can be stored in certain medium, such as computer storage devices, including but not limited to ROM (Read Only Memory, FLASH Memory, transfer apparatus etc.), magnetic storage medium (such as magnetic tape, magnetic driver and so on), optical storage medium (such as CD-ROM, DVD-ROM, paper card, paper tape and so on) and other familiar types of program memories. Besides, it should be realized that these methods can be executed by human operators by choosing software tools without human or creative determination.

INDUSTRIAL APPLICABILITY

The embodiments of the terminal device, system and method according to the present document support connections with a plurality of peripheral groups, so that a plurality of users can access in a uniform and centralized way, providing a new application mode for the virtual desktop system, reducing the cost of the virtual desktop system, and improving the performance of the virtual desktop.

What is claimed is:

1. A terminal device, wherein the terminal device comprises:
a plurality of peripheral interface groups, configured to: connect with a plurality of peripheral groups, wherein each of the peripheral groups comprises one or more input apparatus;
wherein, one user is supplied with one peripheral group for operation, each of the peripheral groups is driven and managed by one separate virtual machine;
a plurality of virtual machines, configured to: control corresponding virtual desktops supplied by a virtual desktop server system according to operating data input by the peripheral groups; and
a network interface, configured to: connect with the virtual desktop server system;
wherein, the peripheral interface groups, the peripheral groups, and corresponding relationships among the peripheral groups, the peripheral interface groups, and the virtual machines are allocated dynamically by the terminal device.

2. The terminal device as claimed in claim 1, wherein, the peripheral groups further comprise an output apparatus, the virtual machines are further configured to: drive and manage the output apparatus of corresponding peripheral groups.

3. The terminal device as claimed in claim 1, wherein, the input apparatus comprise keyboards or mouses; the output apparatus comprise displays and/or USB interfaces.

4. The terminal device as claimed in claim 1, wherein, the peripheral groups are independent of one another, and the virtual machines are independent of one another.

5. The terminal device as claimed in claim 1, wherein, the peripheral interface groups and the corresponding peripheral groups use one or more connection techniques, and the connections are wired or wireless.

6. The terminal device as claimed in claim 1, wherein, the virtual machines communicate with the virtual desktop server system in a virtual desktop transport protocol.

7. A system for accessing a virtual desktop, wherein the system comprises a plurality of peripheral groups used for human-computer interaction and the terminal device as claimed in claim 1.

8. A method for accessing a virtual desktop, realized based on a terminal device, wherein, the terminal device supports a plurality of peripheral groups used for human-computer interaction, and the terminal device comprises a plurality of peripheral interface groups, a plurality of virtual machines, and a network interface, the method comprises:
the peripheral groups establishing connections with corresponding peripheral interface groups, wherein each of the peripheral groups comprises one or more input apparatus; wherein, one user is supplied with one peripheral group for operation, each of the peripheral groups is driven and managed by one separate virtual machine;
operating data input by the peripheral groups being transmitted to corresponding virtual machines through corresponding peripheral interface groups;
the virtual machines controlling corresponding virtual desktops supplied by the virtual desktop server system through the network interface according to the operating data;
wherein; the peripheral interface groups, the peripheral groups; and corresponding relationships among the peripheral groups, the peripheral interface groups, and the virtual machines are allocated dynamically by the terminal device.

9. The method as claimed in claim 8, wherein, the peripheral groups further comprise an output apparatus; after the peripheral groups establish connections with corresponding peripheral interface groups, the method further comprises:

outputting the virtual desktops of the virtual desktop server system to corresponding virtual machines through the network interface;

the virtual machines driving and managing the output apparatus of corresponding peripheral groups through the peripheral interface groups.

10. The method as claimed in claim 9, wherein, the input apparatus comprise keyboards or mouses; the output apparatus comprise displays and/or USB interfaces.

11. The method as claimed in claim 8, wherein, the peripheral interface groups connect with the corresponding peripheral groups by one or more connection techniques, the connections are wired or wireless.

* * * * *